US011775633B2

(12) United States Patent
Sanders-Reed (10) Patent No.: US 11,775,633 B2
(45) Date of Patent: Oct. 3, 2023

(54) COMPUTER SYSTEM INTEGRITY THROUGH A COMBINATION OF CERTIFIABLE AND QUALIFIABLE SOFTWARE

(71) Applicant: THE BOEING COMPANY, Chicago, IL (US)

(72) Inventor: John Newell Sanders-Reed, Tijeras, NM (US)

(73) Assignee: The Boeing Company, Chicago, IL (US)

( * ) Notice: Subject to any disclaimer, the term of this patent is extended or adjusted under 35 U.S.C. 154(b) by 779 days.

(21) Appl. No.: 16/209,506

(22) Filed: Dec. 4, 2018

(65) Prior Publication Data
US 2020/0175151 A1    Jun. 4, 2020

(51) Int. Cl.
*G06F 21/51*      (2013.01)
*G06N 20/00*    (2019.01)
(Continued)

(52) U.S. Cl.
CPC .......... *G06F 21/51* (2013.01); *G06F 11/3608* (2013.01); *G06F 21/121* (2013.01);
(Continued)

(58) Field of Classification Search
CPC .... G06F 21/51; G06F 11/3608; G06F 21/121; G06F 2201/81; G06F 2201/865;
(Continued)

(56) References Cited

U.S. PATENT DOCUMENTS

| 7,913,232 B2 * | 3/2011 | Erkkinen | G06F 11/3672 |
| | | | 717/126 |
| 9,933,521 B2 | 4/2018 | Riley et al. | |

(Continued)

OTHER PUBLICATIONS

European Search Report from corresponding European Appl. No. 19210589.8, dated Jun. 16, 2020.

(Continued)

*Primary Examiner* — Jeffrey C Pwu
*Assistant Examiner* — Nega Woldemariam
(74) *Attorney, Agent, or Firm* — Quinn IP Law (57) ABSTRACT

A method of improving integrity of a computer system includes executing certifiable and qualifiable software applications. The certifiable software application is composed of static program instructions executed sequentially to process input data to produce an output, and the qualifiable software application uses a model iteratively built using a machine learning algorithm to process the input data to produce a corresponding output. The certifiable software application is certifiable for the computer system according to a certification standard, and the qualifiable software application being non-certifiable for the computer system according to the certification standard. The method also includes cross-checking the output by comparison with the corresponding output to verify the output, and thereby improve integrity of the computer system. And the method includes generating an alert that the output is unverified when the comparison indicates that the output differs from the corresponding output by more than a threshold.

21 Claims, 4 Drawing Sheets

(51) Int. Cl.
　　*G06F 11/36*　　(2006.01)
　　*G06F 21/12*　　(2013.01)
(52) U.S. Cl.
　　CPC ......... *G06N 20/00* (2019.01); *G06F 2201/81* (2013.01); *G06F 2201/865* (2013.01); *G06F 2221/033* (2013.01)
(58) Field of Classification Search
　　CPC .......... G06F 2221/033; G06F 11/1629; G06F 11/1476; G06F 11/1487; G06F 3/0607; G06N 20/00
　　USPC .......................................................... 726/26
　　See application file for complete search history.

(56) References Cited

U.S. PATENT DOCUMENTS

2018/0005139 A1\* 1/2018 Dhanyamraju ........ G08B 21/18
2019/0009408 A1\* 1/2019 Szatmary ................ G06N 3/00

OTHER PUBLICATIONS

Huang Hu et al, "Applying Machine Learning for Run-Time Bug Detection in Aviation Software", AIAA InfoTech at Aerospace, Jan. 2016; San Diego, CA, USA; American Institute of Aeronautics and Astronautics, vol. 1, pp. 265-274.

Sanaz Taleghani et al, "Robust Moving Object Detection from a Moving Video Camera Using Neural Network and Kalman Filter", RoboCup 2008: Robot Soccer World Cup XII, Conference Proceedings Robocup 2008, Lecture Notes in Artificial Intelligence, vol. 5399, 2009, pp. 638-648.

Vanmali et al, "Using a Neural Network in the Software Testing Process", International Journal of Intelligent Systems, vol. 17, 2002, pp. 45-62.

Xufeng Wang et al, "Drogue Detection for Autonomous Aerial Refueling Based on Convolutional Neural Networks", Chinese Journal of Aeronautics, vol. 30, No. 1, 2017, pp. 380-390.

Shao, Z. "Certified Software", Communications of the ACM, v.53 n.12, Dec. 2010, pp. 1-9.

\* cited by examiner

COMPUTER SYSTEM INTEGRITY THROUGH A COMBINATION OF CERTIFIABLE AND QUALIFIABLE SOFTWARE

TECHNOLOGICAL FIELD

The present disclosure relates generally to computer systems and, in particular, to combining certifiable and qualifiable software to improve computer system integrity.

BACKGROUND

In many industries such as aerospace, high integrity is mandatory. For many of these industries, there are requirements that software meet various certification standards or levels of assurance. In aerospace, for example, DO-178 requirements promulgated by the Radio Technical Commission for Avionics (RTCA) provide for a number of different aircraft-related certification levels for software/hardware systems. Certification is intended to ensure that the software operates exactly and only as designed. This often means beginning with a certifiable operating system (OS), and compilers that are assured to accurately translate high-level code into machine language. The application code is then tested and inspected on a line-by-line basis. But even this does not mean the result will be as intended.

Image Processing provides a good example of the problem. While many high integrity systems operate on one or two time varying signals that can be well characterized, video systems are inherently more complex. The input imagery (video) includes millions of pixels. One result is that it is extremely difficult to completely characterize all possible inputs. It is equally difficult to ensure that any image or video processing algorithms will return a "proper" result under all conditions, even if the software is otherwise certifiable. One way in which this uncertainty is often mitigated is to have a trained (qualified) human operator providing oversight.

In certain high-integrity contexts (such as flight control systems), additional integrity is obtained by having multiple (often three) parallel and independent, but identical computers running the same software on the same input. In this case, the outputs are expected to match exactly, and a comparison operation on the output is used to ensure all computers produce the same result.

Artificial intelligence based on machine learning (AWL) takes a radically different approach. In some examples, the AWL software implements a multi-layer, multi-node "neural net" trained with labeled example data sets. The learning system adjusts the connections between nodes to "learn" the topology that provides the correct results. While these systems can be "frozen" such that the behavior is fixed and not evolving, it is still not feasible to follow a linear thread of execution as is done for certifiable systems. As a result, these powerful systems cannot currently be certified. Current discussions involving how to utilize these systems in high-integrity applications involve the idea of "qualifying" the system much as a human is "qualified" through training and testing/evaluation in various scenarios. But this approach is not yet acceptable in systems in which high integrity is required.

Therefore it would be desirable to have a system and method that takes into account at least some of the issues discussed above, as well as other possible issues.

BRIEF SUMMARY

Example implementations of the present disclosure are directed to combining certifiable and qualifiable software to improve computer system integrity. In particular, some example implementations utilize non-certifiable machine learning software to cross check certifiable software and thereby improve computer system integrity. In some examples, the output of certifiable software may simply be cross-checked with corresponding output of qualifiable software.

In some examples, the output and corresponding output may be combined to produce a combined output and thereby not only improve integrity but also the robustness of the computer system. In this regard, the different software may provide similar but slightly different outputs with respective figures of merit. If the outputs agree to a sufficient degree, they may be weighted (by figure of merit) and combined (e.g., in a Kalman filter) to provide improved performance.

The present disclosure thus includes, without limitation, the following example implementations.

Some example implementations provide a computer system, the method comprising the computer system executing a certifiable software application composed of static program instructions executed sequentially to process input data to produce an output on which the computer system is configured to operate, the certifiable software application being certifiable for the computer system according to a certification standard; executing a qualifiable software application during execution of the certifiable software application, the qualifiable software application using a model iteratively built using a machine learning algorithm to process the input data to produce a corresponding output, the qualifiable software application being non-certifiable for the computer system according to the certification standard; cross-checking the output from the certifiable software application by comparison with the corresponding output from the qualifiable software application to verify the output from the certifiable software application, and thereby improve integrity of the computer system; and generating an alert that the output from the certifiable software application is unverified when the comparison indicates that the output differs from the corresponding output by more than a threshold.

In some example implementation of the method of any preceding example implementation, or any combination of any preceding example implementations, the output from the certifiable software application is verified when the comparison indicates that the output differs from the corresponding output from the qualifiable software application by no more than the threshold, and the method further comprises the computer system operating on the output on which the computer system is configured to operate, and exclusive of the corresponding output from the qualifiable software application.

In some example implementation of the method of any preceding example implementation, or any combination of any preceding example implementations, the output from the certifiable software application is verified when the comparison indicates that the output differs from the corresponding output from the qualifiable software application by no more than the threshold, and the method further comprises the computer system producing a combined output from the output and the corresponding output; and operating on the combined output.

In some example implementation of the method of any preceding example implementation, or any combination of any preceding example implementations, executing the certifiable software application, and executing the qualifiable software application, further include producing respective figures of merit for the output and the corresponding output, and wherein producing the combined output includes Kalman filtering the output and the corresponding output weighted by the respective figures of merit.

In some example implementation of the method of any preceding example implementation, or any combination of any preceding example implementations, executing a third software application as the certifiable software application and the qualifiable software application are executed, the third software application being a second certifiable or qualifiable software application, the third software application being executed to process the input data to produce a second corresponding output, wherein cross-checking the output includes cross-checking the output from the certifiable software application by comparison with the corresponding output and the second corresponding output, and wherein generating the alert includes generating the alert that the output from the certifiable software is unverified when the comparison indicates that the output differs from both the corresponding output and the second corresponding output by more than the threshold.

In some example implementation of the method of any preceding example implementation, or any combination of any preceding example implementations, the computer system is an avionics system of an aircraft moving toward a hub that defines a target for the aircraft, the certifiable software application is a certifiable object detection application, and the qualifiable software application is a qualifiable object detection application, wherein executing the certifiable software application includes executing the certifiable object detection application to process an image of the hub to produce an output in which the target is detected in the image, wherein executing the qualifiable software application includes executing the qualifiable object detection application to process the image of the hub to produce a corresponding output in which the target is detected in the image, and wherein cross-checking the output includes cross-checking the output by comparison with the corresponding output to verify the output from the certifiable object detection application.

In some example implementation of the method of any preceding example implementation, or any combination of any preceding example implementations, the output from the certifiable object detection application is verified when the comparison indicates that the output differs from the corresponding output by no more than the threshold that decreases with distance between the aircraft and the hub.

Some example implementations provide a computer system that comprises a memory configured to store computer-readable program code; and processing circuitry configured to access the memory, and execute the computer-readable program code to cause the computer system to at least perform the method of any preceding example implementation, or any combination of any preceding example implementations.

Some example implementations provide a computer-readable storage medium that is non-transitory and has computer-readable program code stored therein that in response to execution by processing circuitry, causes a computer system to at least perform the method of any preceding example implementation, or any combination of any preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to computer systems and, in particular, to combining certifiable and qualifiable software to improve computer system integrity. The computer system may be any of a number of different computer systems for which software is certifiable according to a certification standard. In particular, the computer system may be an avionic system onboard a manned or unmanned aircraft, artificial satellites, spacecraft and the like. Examples of suitable avionic system include the avionic systems for flight control systems, aerial positioning systems, autonomous take-off or landing systems, rendezvous and docking systems, or any other safety-critical, high-integrity system. In other examples, the computer system may be a computer system used outside aviation. Examples include automatic surgical procedures, computer controlled medical devices, autonomous ground or maritime vehicles and functions. Still other examples include factory automation or inspection and repair services in which robotic or computer controlled systems interact with or in the vicinity of humans.

The certifiable software is generally a software application (certifiable software application) composed of static program instructions executed sequentially to process input data to produce an output on which the computer system is configured to operate. A classic example is the Vehicle Management System or Flight Control Computer that translates steering and throttle commands into aircraft surface movements. Other examples include more generally any system that protects the flight envelope or provides safety-critical information to a human wherein presentation of erroneous information may result in the operator selecting an unsafe alternative.

The certifiable software application is certifiable for the computer system according to a certification standard; and when certified, the certifiable software application may be referred to as a certified software application. Examples of suitable certifiable software include embedded software in avionic systems, at least some of which is certifiable according to DO-178. This in particular includes avionics software, which is generally embedded software used in avionics and that has legally mandated safety and reliability. Other examples of suitable certifiable software include software used on manned or unmanned aircraft, artificial satellites, spacecraft and the like, which does not have legally mandated safety and reliability.

The qualifiable software is generally a software application (qualifiable software application) that is non-certifiable for the computer system according to an existing certification standard. As primarily described herein, the qualifiable software uses machine learning to produce an output corresponding to the output of a certifiable software application. In particular, the qualifiable software application uses a model iteratively built using a machine learning algorithm to process the input data to produce the corresponding output. One example of a suitable machine learning algorithm is an artificial neural network (ANN). Other examples include regression algorithms, decision trees, support vector machines, Bayesian networks and the like. Relative to the certifiable software application, the qualifiable software application is non-certifiable for the computer system according to the certification standard. The qualifiable software application is qualifiable for the computer system much as a human is "qualified" through training and testing/evaluation in various scenarios. And when qualified, the qualifiable software application may be referred to as a qualified software application.

Figure 1:
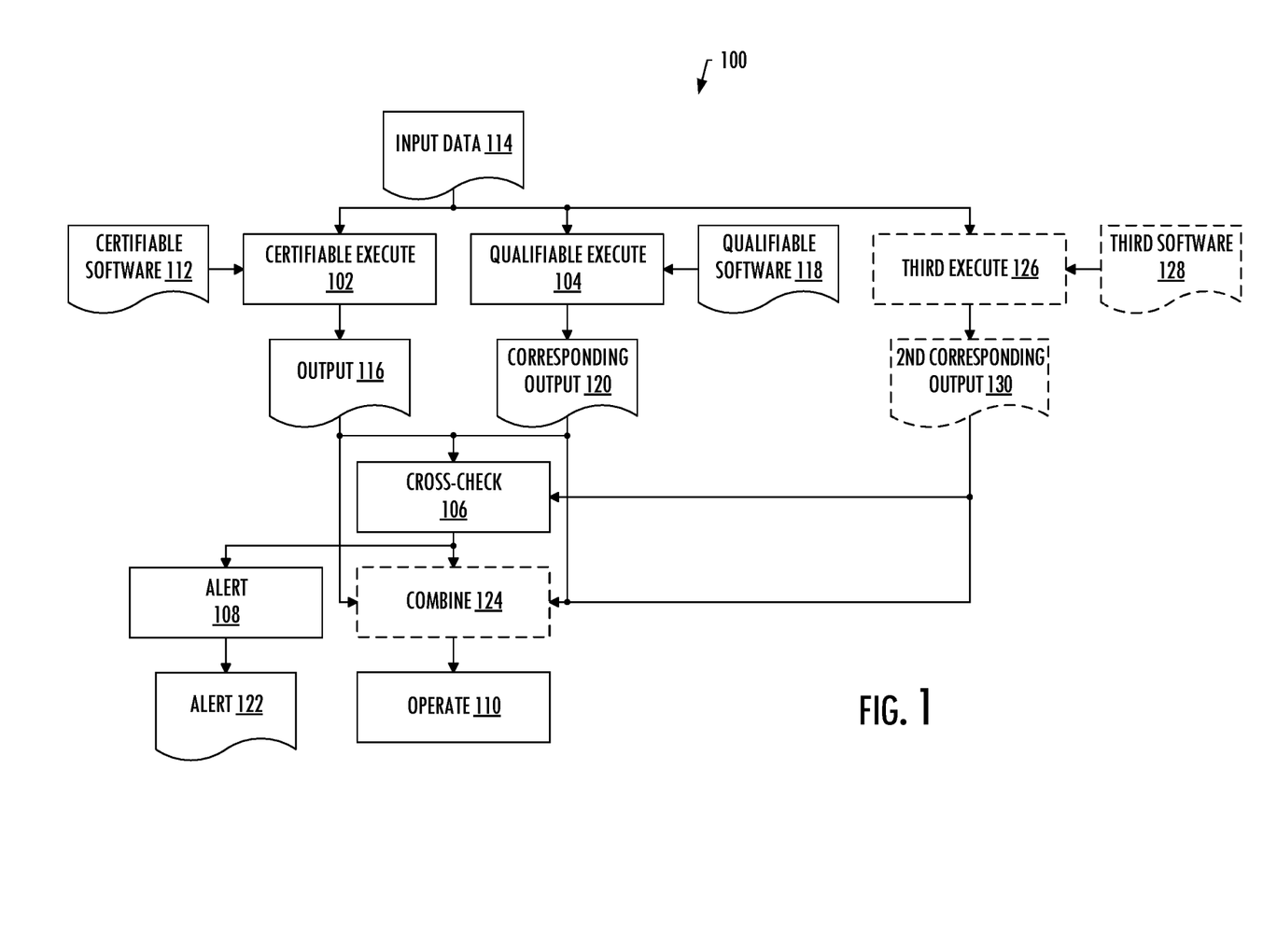
FIG. 1 is a functional block diagram of a computer system with improved integrity, according to example implementations of the present disclosure.

FIG. 1 is a functional block diagram of a computer system 100, according to example implementations of the present disclosure. The computer system may include any of a number of different functional blocks for performing one or more functions or operations. As shown, in some examples, the computer system includes a certifiable execute block 102, a qualifiable execute block 104, a cross-check block 106, an alert block 108 and an operate block 110. The functional blocks including the certifiable execute block, qualifiable execute block, cross-check block, alert block and operate block may be co-located or directly coupled to one another, or in some examples, various ones of the functional blocks may communicate with one another across one or more computer networks. Further, although shown as part of the computer system, it should be understood that any one or more of the above may be external to the computer system without regard to any of the other functional blocks. It should also be understood that the computer system may include one or more additional or alternative functional blocks than those shown in FIG. 1.

In some example implementations, the certifiable execute block 102 is configured to execute a certifiable software application 112. As explained above, the certifiable software application is composed of static program instructions executed sequentially to process input data 114—such as sensor data—to produce an output 116 on which the computer system 100 is configured to operate. The certifiable software application is certifiable for the computer system according to a certification standard.

The qualifiable execute block 104 is configured to execute a qualifiable software application 118 during execution of the certifiable software application 112. The qualifiable software application uses a model iteratively built using a machine learning algorithm to process the input data 114 to produce a corresponding output 120. The qualifiable software application is non-certifiable for the computer system according to the certification standard.

The cross-check block 106 is configured to cross-check the output 116 from the certifiable software application 112 by comparison with the corresponding output 120 from the qualifiable software application 118 to verify the output from the certifiable software application, and thereby improve integrity of the computer system 100. The alert block 108 is configured to generate an alert 122 that the output from the certifiable software application is unverified when the comparison indicates that the output differs from the corresponding output by more than a threshold. This threshold may depend on the type of computer system and/or the certifiable software application, and it may define an acceptable variation or tolerance in the output from the certifiable software application.

The output 116 from the certifiable software application 112 is verified when the comparison indicates that the output differs from the corresponding output 120 from the qualifiable software application 118 by no more than the threshold. In these examples, the computer system 100 may operate on the output (the computer system being configured to operate on the output). For this, the computer system further includes the operate block 110 configured to operate on the output. The operation often depends on the type of computer system, such as the type of avionics system implementing example implementations of the present disclosure. Examples include generating trajectories based on input sensor data, such trajectories then being passed to a Vehicle Management System.

In some examples, the qualifiable software application 118 is simply used to verify the certifiable software application 112. In these examples, the operate block 110 is configured to operate on the output 116 exclusive of the corresponding output 120 from the qualifiable software application. In other examples, the qualifiable software application may be further used to increase accuracy of the certifiable software application. Here, the computer system 100 further includes a combine block 124 configured to produce a combined output from the output and the corresponding output. The operate block, then, is configured to operate on the combined output.

In some further examples, the certifiable execute block 102 and qualifiable execute block 104 are further configured to produce respective figures of merit for the output 116 and the corresponding output 120. In some of these examples, the combine block 124 is configured to Kalman filter the output and the corresponding output weighted by the respective figures of merit to produce the combined output.

Although described as including certifiable and qualifiable software applications 112, 118, it should be understood that the computer system 100 may be configured to execute more than the two software applications for use in example implementations of the present disclosure. That is, the computer system may make use of three or more software applications. In particular, in some examples, the computer system 100 further includes a third execute block 126 configured to execute a third software application 128 as the certifiable software application 112 and the qualifiable software application 118 are executed.

In examples including the third software application 128 (or more), the third software application is a second certifiable or qualifiable software application, or some other software application. The third software application is executed to process the input data 114 to produce a second corresponding output 130. The cross-check block 106, then, is configured to cross-check the output 116 from the certifiable software application 112 by comparison with the corresponding output 120 and the second corresponding output 130. And the alert block 108 is configured to generate the alert 122 that the output from the certifiable software is unverified when the comparison indicates that the output differs from both the corresponding output and the second corresponding output by more than the threshold.

As indicated above, the computer system 100 may be any of a number of different computer systems. In some examples, the computer system is an avionic system onboard a manned or unmanned aircraft, artificial satellites, spacecraft and the like. In this context, automated air-to-air refueling (A3R), as well as automated spacecraft rendezvous and docking, involve bringing two aerospace vehicles together with high precision sufficient to accomplish a connection maneuver. It is generally important that an autonomous system identify the correct target for this connection. To illustrate, an automated receiver aircraft attempting to perform A3R by inserting its probe into a tanker drogue must be certain that the circular feature identified is in fact the drogue and not the exhaust from an engine. Similarly, an automated tanker boom must be certain that it is attempting to insert into the receptacle and not a cockpit window.

In many high-integrity contexts, integrity can be achieved by use of a diversity of data sources (e.g., multiple sensors providing different viewing geometries or even different sensing techniques such as passive imaging and 3D LIDAR), and by using a diversity of algorithms on each data source. In the case of A3R, two passive imaging cameras may be used, each imaging the same region, but mounted at different locations to provide a diversity of source data (if something obscures one camera, the region may still be visible in the other camera). For each camera, both a certifiable software application and a qualifiable software application may be executed on the input image data, and their respective outputs compared.

In some examples, the allowable difference (threshold) decreases with distance between the two aircraft, but as long as both software applications agree to within the allowable tolerance, the operation may proceed. Depending on requirements, the qualifiable software application may only serve as a cross-check on the certifiable software application. In these examples, as long as the two software applications agree, the output from the certifiable software application is used. If they do not agree, the computer system declares an error, generates an alert, and the operation is terminated. In some examples in which the software applications agree, their respective outputs may be input into a Kalman filter to improve overall accuracy.

Figure 2:
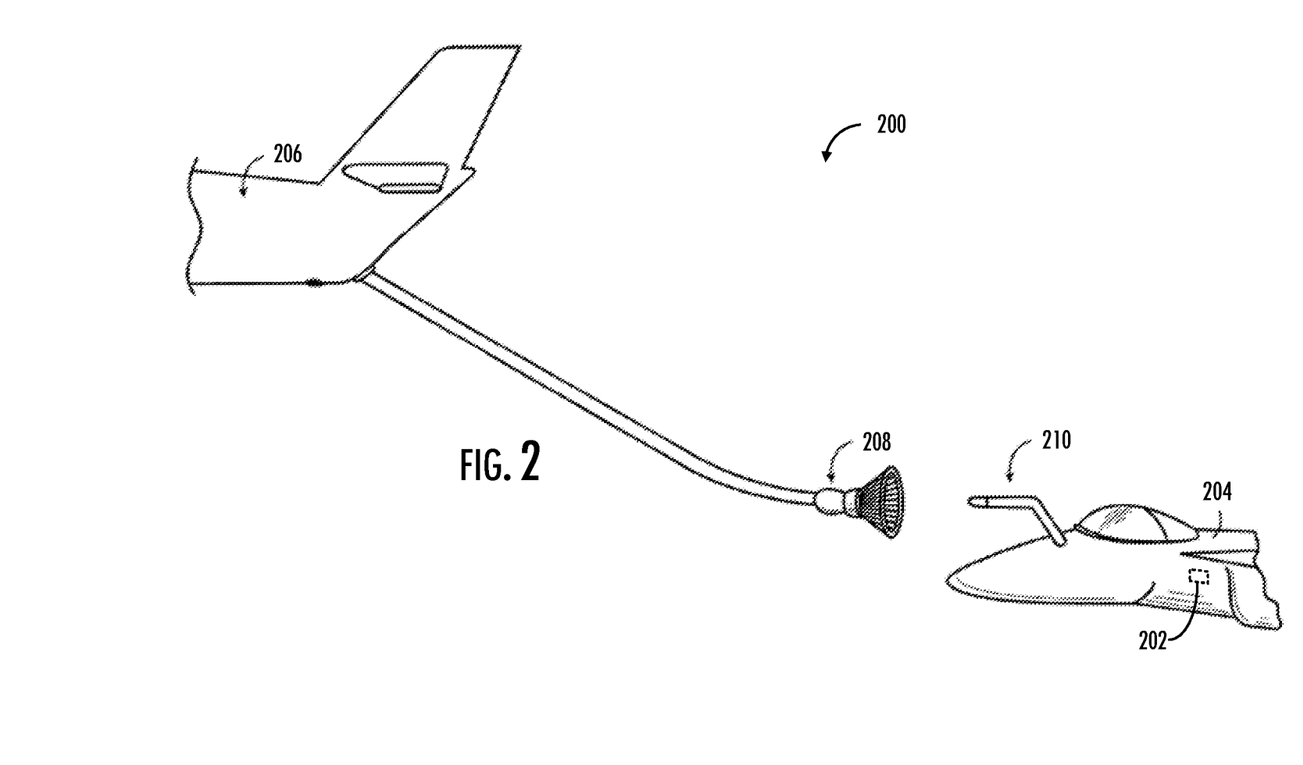
FIG. 2 illustrates automated air-to-air refueling, according to various example implementations.

FIG. 2 illustrates automated air-to-air refueling 200, according to some examples. In these examples, the computer system 100 is an avionics system 202 of an aircraft 204 moving toward a hub 206 that defines a target 208 for the aircraft. As illustrated, the hub is a fueling or tanker aircraft (or simply "tanker"), and the target for the aircraft is a drogue that extends aft of the tanker from an elongate hose. The aircraft carries a refueling probe 210 and approaches the hub, such as from the aft and below, in an effort to engage the refueling probe with the drogue and to thereafter provide for aerial refueling of the aircraft. Here, the certifiable software application 112 and the qualifiable software application 118 may be respectively a certifiable object detection application and a qualifiable object detection application.

The certifiable execute block 102 may be configured to execute the certifiable object detection application to process an image of the hub 206 to produce an output in which the target 208 is detected in the image. Similarly, the qualifiable execute block 104 may be configured to execute the qualifiable object detection application to process the image of the hub to produce a corresponding output in which the target is detected in the image. The cross-check block 106 may be configured to cross-check the output by comparison with the corresponding output to verify the output from the certifiable object detection application. And in some examples, the output is verified when the comparison indicates that it differs from the corresponding output by no more than the threshold that decreases with distance between the aircraft and the hub. More information regarding a system for automated air-to-air refueling that may benefit from example implementations of the present disclosure is provided in U.S. Pat. No. 9,933,521, Aerial Positioning Systems and Methods, the content of which is incorporated by reference in its entirety.

Figure 3:
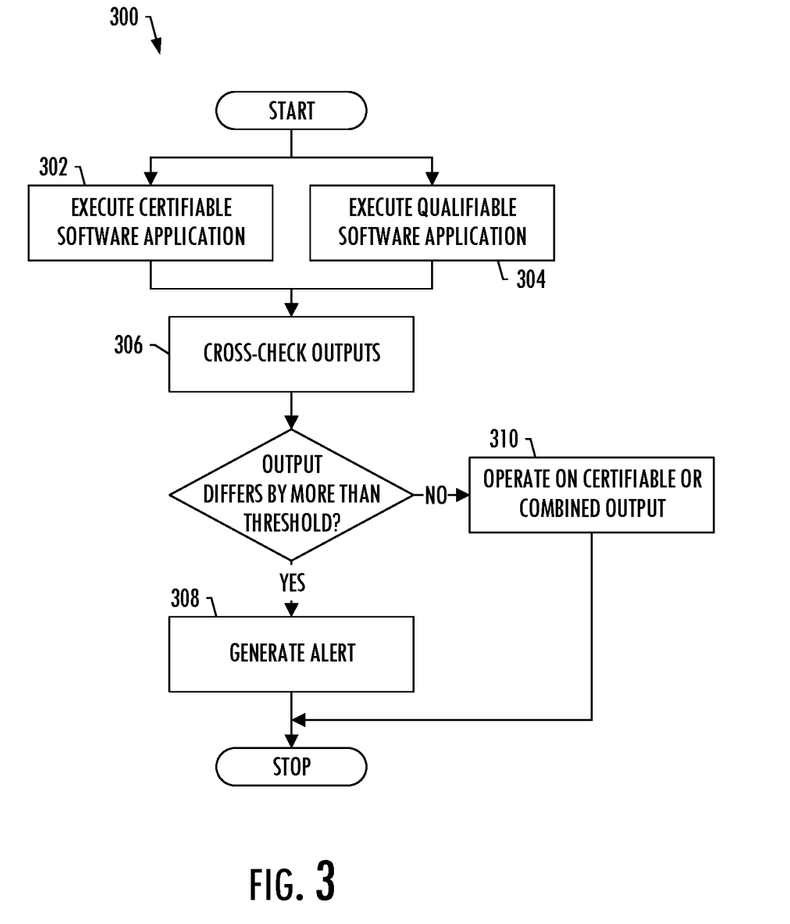
FIG. 3 is a flowchart illustrating various steps in a method of improving integrity of a computer system, according to various example implementations.

FIG. 3 is a flowchart illustrating various steps in a method 300 of improving integrity of a computer system, according to example implementations of the present disclosure. As shown at step 302, the method includes executing a certifiable software application composed of static program instructions executed sequentially to process input data to produce an output on which the computer system is configured to operate. In this regard, the certifiable software application is certifiable for the computer system according to a certification standard.

The method 300 includes executing a qualifiable software application during execution of the certifiable software application, as shown at step 304. The qualifiable software application uses a model iteratively built using a machine learning algorithm to process the input data to produce a corresponding output. The qualifiable software application is non-certifiable for the computer system according to the certification standard.

The method 300 includes cross-checking the output from the certifiable software application by comparison with the corresponding output from the qualifiable software application to verify the output from the certifiable software application, and thereby improve integrity of the computer system, as shown at step 306. As shown at step 308, the method includes generating an alert that the output from the certifiable software application is unverified when the comparison indicates that the output differs from the corresponding output by more than a threshold. The output from the certifiable software application is verified when the comparison indicates that the output differs from the corresponding output from the qualifiable software application by no more than the threshold. In some examples, then, the method further includes operating on the output or a combined output, as shown at step 310.

According to example implementations of the present disclosure, the computer system 100 and its functional blocks including the certifiable execute block 102, a qualifiable execute block 104, a cross-check block 106, alert block 108, operate block 110, combine block 124 and third execute block 126 may be implemented by various means. Means for implementing the computer system and its functional blocks may include hardware, alone or under direction of one or more computer programs from a computer-readable storage medium. In some examples, the computer system may be embodied by one or more apparatuses configured to function as or otherwise implement the functional blocks shown and described herein. In examples involving more than one apparatus, the respective apparatuses may be connected to or otherwise in communication with one another in a number of different manners, such as directly or indirectly via a wired or wireless network or the like.

Figure 4:
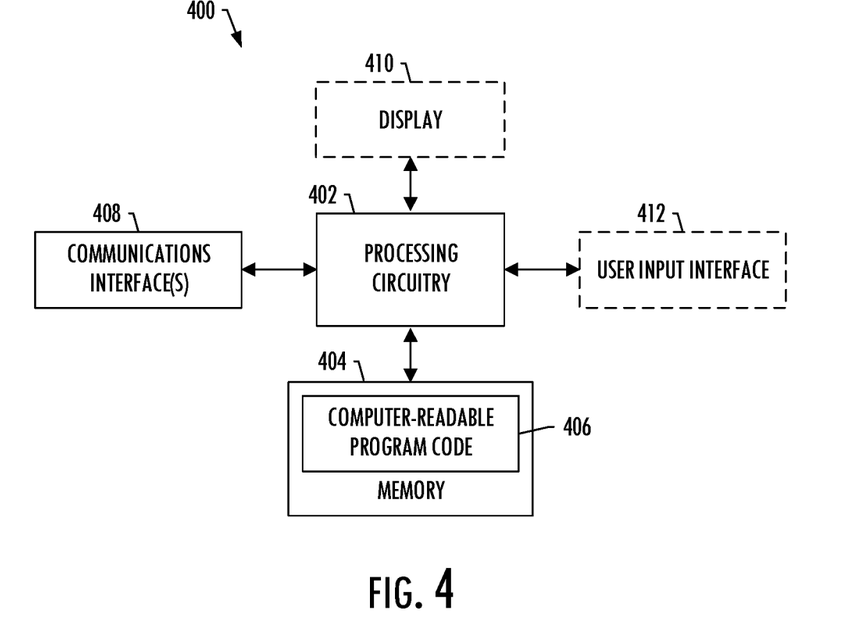
FIG. 4 illustrates a computer system according to some example implementations.

FIG. 4 illustrates an apparatus 400 according to some example implementations of the present disclosure. Generally, the apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. For certifiable avionics systems, suitable electronic devices are usually composed of a certifiable electronics chassis with backplane and one or more certifiable processor cards. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. The processing circuitry may include a graphic processing unit (GPU), a central processing unit (CPU), or a combination of GPU and CPU. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit). The communications interface may be configured to transmit and/or receive information, such as to and/or from other apparatus(s), network(s) or the like. The communications interface may be configured to transmit and/or receive information by physical (wired) and/or wireless communications links. Examples of suitable communication interfaces include a network interface controller (NIC), wireless NIC (WNIC) or the like.

In some examples, the interfaces may include one or more user interfaces, such as a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based apparatuses and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer system comprising:
    a memory configured to store computer-readable program code; and
    processing circuitry configured to access the memory, and execute the computer-readable program code to cause the computer system to at least:
    execute a certifiable software application composed of static program instructions executed sequentially to process input data to produce an output on which the computer system is configured to operate, the certifiable software application being certifiable for the computer system according to a certification standard;
    execute a qualifiable software application during execution of the certifiable software application, the qualifiable software application using a model iteratively built using a machine learning algorithm to process the input data to produce a corresponding output, the qualifiable software application being non-certifiable for the computer system according to the certification standard;
    cross-check the output from the certifiable software application by comparison with the corresponding output from the qualifiable software application to verify the output from the certifiable software application, and thereby improve integrity of the computer system; and
    generate an alert that the output from the certifiable software application is unverified when the comparison indicates that the output differs from the corresponding output by more than a threshold.

2. The computer system of claim 1, wherein the output from the certifiable software application is verified when the comparison indicates that the output differs from the corresponding output from the qualifiable software application by no more than the threshold, and the memory stores further computer-readable program code that the processing circuitry is configured to execute to cause the computer system to further at least:
    operate on the output on which the computer system is configured to operate, and exclusive of the corresponding output from the qualifiable software application.

3. The computer system of claim 1, wherein the output from the certifiable software application is verified when the comparison indicates that the output differs from the corresponding output from the qualifiable software application by no more than the threshold, and the memory stores further computer-readable program code that the processing circuitry is configured to execute to cause the computer system to further at least:
    produce a combined output from the output and the corresponding output; and
    operate on the combined output.

4. The computer system of claim 3, wherein the computer system being caused to execute the certifiable software application, and execute the qualifiable software application, further includes the computer system being caused to produce respective figures of merit for the output and the corresponding output, and
    wherein the computer system being caused to produce the combined output includes being caused to Kalman filter the output and the corresponding output weighted by the respective figures of merit.

5. The computer system of claim 1, wherein the memory stores further computer-readable program code that the processing circuitry is configured to execute to cause the computer system to further at least:
    execute a third software application as the certifiable software application and the qualifiable software application are executed, the third software application being a second certifiable or qualifiable software application, the third software application being executed to process the input data to produce a second corresponding output, wherein the computer system being caused to cross-check the output includes being caused to cross-check the output from the certifiable software application by comparison with the corresponding output and the second corresponding output, and wherein the computer system being caused to generate the alert includes being caused to generate the alert that the output from the certifiable software application is unverified when the comparison indicates that the output differs from both the corresponding output and the second corresponding output by more than the threshold.

6. The computer system of claim 1, wherein the computer system is an avionics system of an aircraft moving toward a hub that defines a target for the aircraft, the certifiable software application is a certifiable object detection application, and the qualifiable software application is a qualifiable object detection application, wherein the computer system being caused to execute the certifiable software application includes being caused to execute the certifiable object detection application to process an image of the hub to produce an output in which the target is detected in the image, wherein the computer system being caused to execute the qualifiable software application includes being caused to execute the qualifiable object detection application to process the image of the hub to produce a corresponding output in which the target is detected in the image, and wherein the computer system being caused to cross-check the output includes being caused to cross-check the output by comparison with the corresponding output to verify the output from the certifiable object detection application.

7. The computer system of claim 6, wherein the output from the certifiable object detection application is verified when the comparison indicates that the output differs from the corresponding output by no more than the threshold that decreases with distance between the aircraft and the hub.

8. A method of improving integrity of a computer system, the method comprising the computer system:

executing a certifiable software application composed of static program instructions executed sequentially to process input data to produce an output on which the computer system is configured to operate, the certifiable software application being certifiable for the computer system according to a certification standard;

executing a qualifiable software application during execution of the certifiable software application, the qualifiable software application using a model iteratively built using a machine learning algorithm to process the input data to produce a corresponding output, the qualifiable software application being non-certifiable for the computer system according to the certification standard;

cross-checking the output from the certifiable software application by comparison with the corresponding output from the qualifiable software application to verify the output from the certifiable software application, and thereby improve integrity of the computer system; and generating an alert that the output from the certifiable software application is unverified when the comparison indicates that the output differs from the corresponding output by more than a threshold.

9. The method of claim 8, wherein the output from the certifiable software application is verified when the comparison indicates that the output differs from the corresponding output from the qualifiable software application by no more than the threshold, and the method further comprises the computer system:

operating on the output on which the computer system is configured to operate, and exclusive of the corresponding output from the qualifiable software application.

10. The method of claim 8, wherein the output from the certifiable software application is verified when the comparison indicates that the output differs from the corresponding output from the qualifiable software application by no more than the threshold, and the method further comprises the computer system:

producing a combined output from the output and the corresponding output; and operating on the combined output.

11. The method of claim 10, wherein executing the certifiable software application, and executing the qualifiable software application, further include producing respective figures of merit for the output and the corresponding output, and wherein producing the combined output includes Kalman filtering the output and the corresponding output weighted by the respective figures of merit.

12. The method of claim 8 further comprising:

executing a third software application as the certifiable software application and the qualifiable software application are executed, the third software application being a second certifiable or qualifiable software application, the third software application being executed to process the input data to produce a second corresponding output, wherein cross-checking the output includes cross-checking the output from the certifiable software application by comparison with the corresponding output and the second corresponding output, and wherein generating the alert includes generating the alert that the output from the certifiable software application is unverified when the comparison indicates that the output differs from both the corresponding output and the second corresponding output by more than the threshold.

13. The method of claim 8, wherein the computer system is an avionics system of an aircraft moving toward a hub that defines a target for the aircraft, the certifiable software application is a certifiable object detection application, and the qualifiable software application is a qualifiable object detection application, wherein executing the certifiable software application includes executing the certifiable object detection application to process an image of the hub to produce an output in which the target is detected in the image, wherein executing the qualifiable software application includes executing the qualifiable object detection application to process the image of the hub to produce a corresponding output in which the target is detected in the image, and wherein cross-checking the output includes cross-checking the output by comparison with the corresponding output to verify the output from the certifiable object detection application.

14. The method of claim 13, wherein the output from the certifiable object detection application is verified when the comparison indicates that the output differs from the corresponding output by no more than the threshold that decreases with distance between the aircraft and the hub.

15. A computer-readable storage medium that is non-transitory and has computer-readable program code stored therein that in response to execution by processing circuitry, causes a computer system to at least:

execute a certifiable software application composed of static program instructions executed sequentially to process input data to produce an output on which the computer system is configured to operate, the certifiable software application being certifiable for the computer system according to a certification standard;

execute a qualifiable software application during execution of the certifiable software application, the qualifiable software application using a model iteratively built using a machine learning algorithm to process the input data to produce a corresponding output, the qualifiable software application being non-certifiable for the computer system according to the certification standard;

cross-check the output from the certifiable software application by comparison with the corresponding output from the qualifiable software application to verify the output from the certifiable software application, and thereby improve integrity of the computer system; and generate an alert that the output from the certifiable software application is unverified when the comparison indicates that the output differs from the corresponding output by more than a threshold.

16. The computer-readable storage medium of claim 15, wherein the output from the certifiable software application is verified when the comparison indicates that the output differs from the corresponding output from the qualifiable software application by no more than the threshold, and the computer-readable storage medium has further computer-readable program code stored therein that in response to execution by the processing circuitry causes the computer system to further at least:

operate on the output on which the computer system is configured to operate, and exclusive of the corresponding output from the qualifiable software application.

17. The computer-readable storage medium of claim 15, wherein the output from the certifiable software application is verified when the comparison indicates that the output differs from the corresponding output from the qualifiable software application by no more than the threshold, and the computer-readable storage medium has further computer-readable program code stored therein that in response to execution by the processing circuitry causes the computer system to further at least:

produce a combined output from the output and the corresponding output; and operate on the combined output.

18. The computer-readable storage medium of claim 17, wherein the computer system being caused to execute the certifiable software application, and execute the qualifiable software application, further includes the computer system being caused to produce respective figures of merit for the output and the corresponding output, and wherein the computer system being caused to produce the combined output includes being caused to Kalman filter the output and the corresponding output weighted by the respective figures of merit.

19. The computer-readable storage medium of claim 15, having further computer-readable program code stored therein that in response to execution by the processing circuitry causes the computer system to further at least:

execute a third software application as the certifiable software application and the qualifiable software application are executed, the third software application being a second certifiable or qualifiable software application, the third software application being executed to process the input data to produce a second corresponding output, wherein the computer system being caused to cross-check the output includes being caused to cross-check the output from the certifiable software application by comparison with the corresponding output and the second corresponding output, and wherein the computer system being caused to generate the alert includes being caused to generate the alert that the output from the certifiable software application is unverified when the comparison indicates that the output differs from both the corresponding output and the second corresponding output by more than the threshold.

20. The computer-readable storage medium of claim 15, wherein the computer system is an avionics system of an aircraft moving toward a hub that defines a target for the aircraft, the certifiable software application is a certifiable object detection application, and the qualifiable software application is a qualifiable object detection application, wherein the computer system being caused to execute the certifiable software application includes being caused to execute the certifiable object detection application to process an image of the hub to produce an output in which the target is detected in the image, wherein the computer system being caused to execute the qualifiable software application includes being caused to execute the qualifiable object detection application to process the image of the hub to produce a corresponding output in which the target is detected in the image, and wherein the computer system being caused to cross-check the output includes being caused to cross-check the output by comparison with the corresponding output to verify the output from the certifiable object detection application.

21. The computer-readable storage medium of claim 20, wherein the output from the certifiable object detection application is verified when the comparison indicates that the output differs from the corresponding output by no more than the threshold that decreases with distance between the aircraft and the hub.

* * * * *